Patented Feb. 5, 1924.

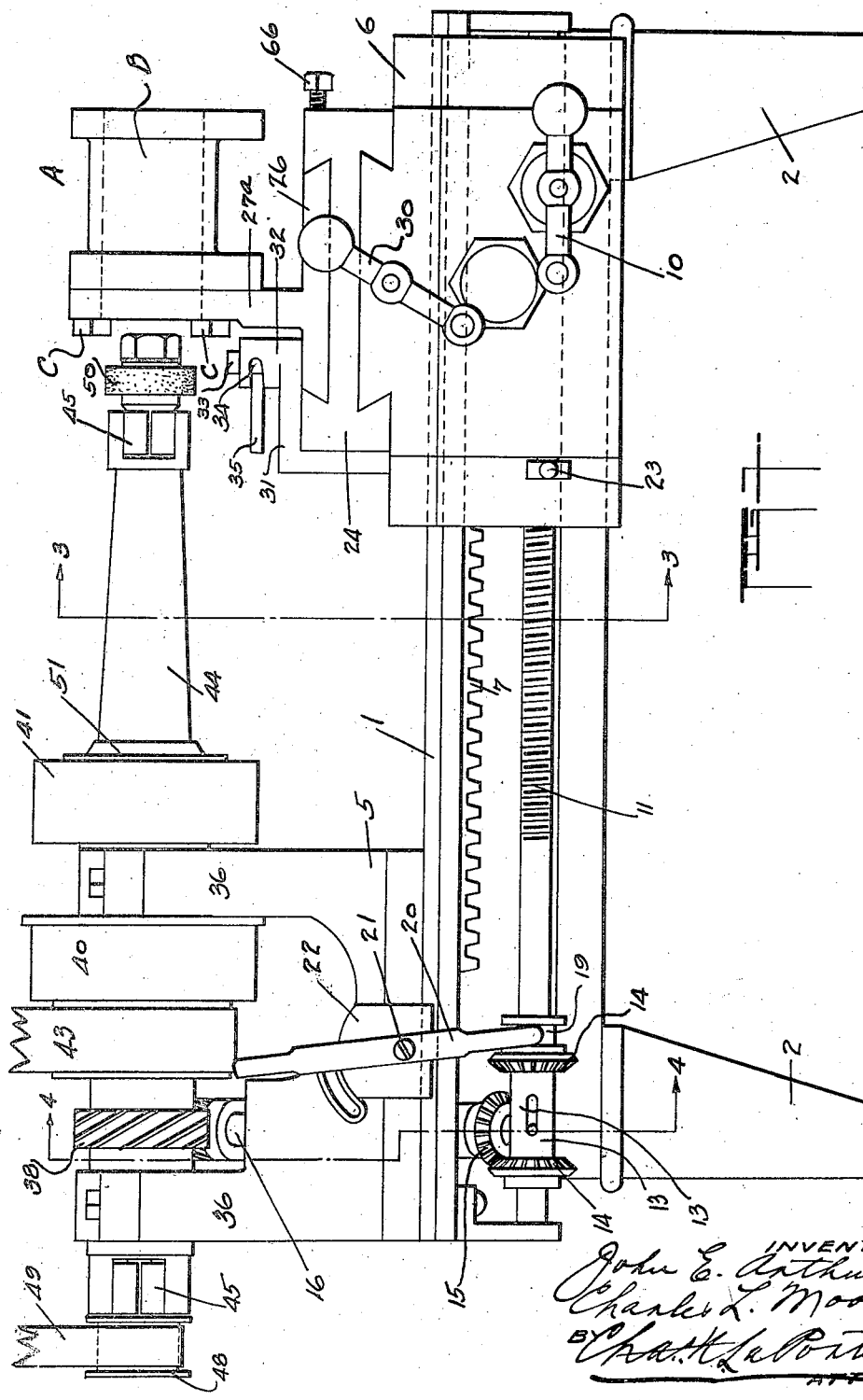

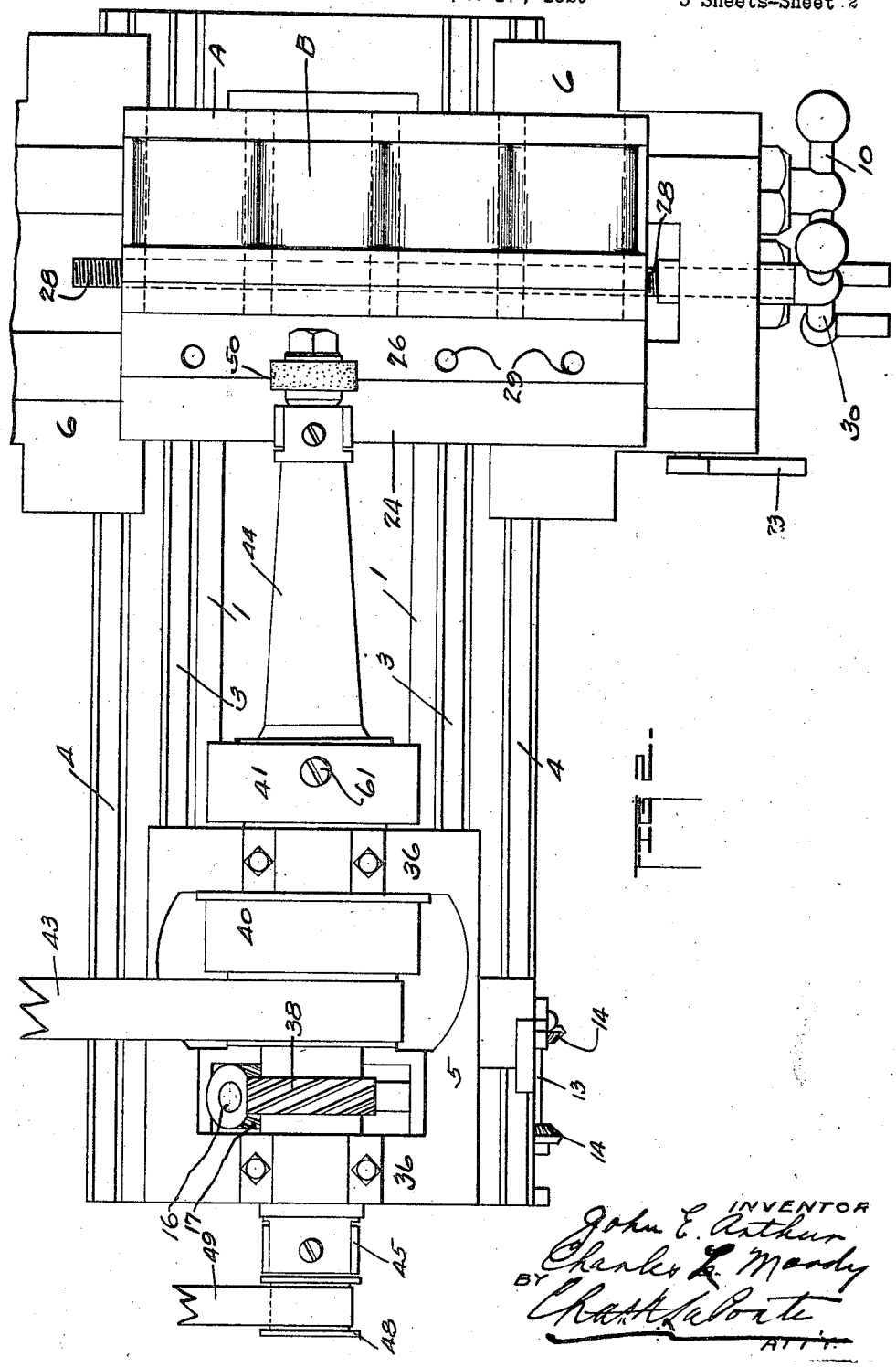

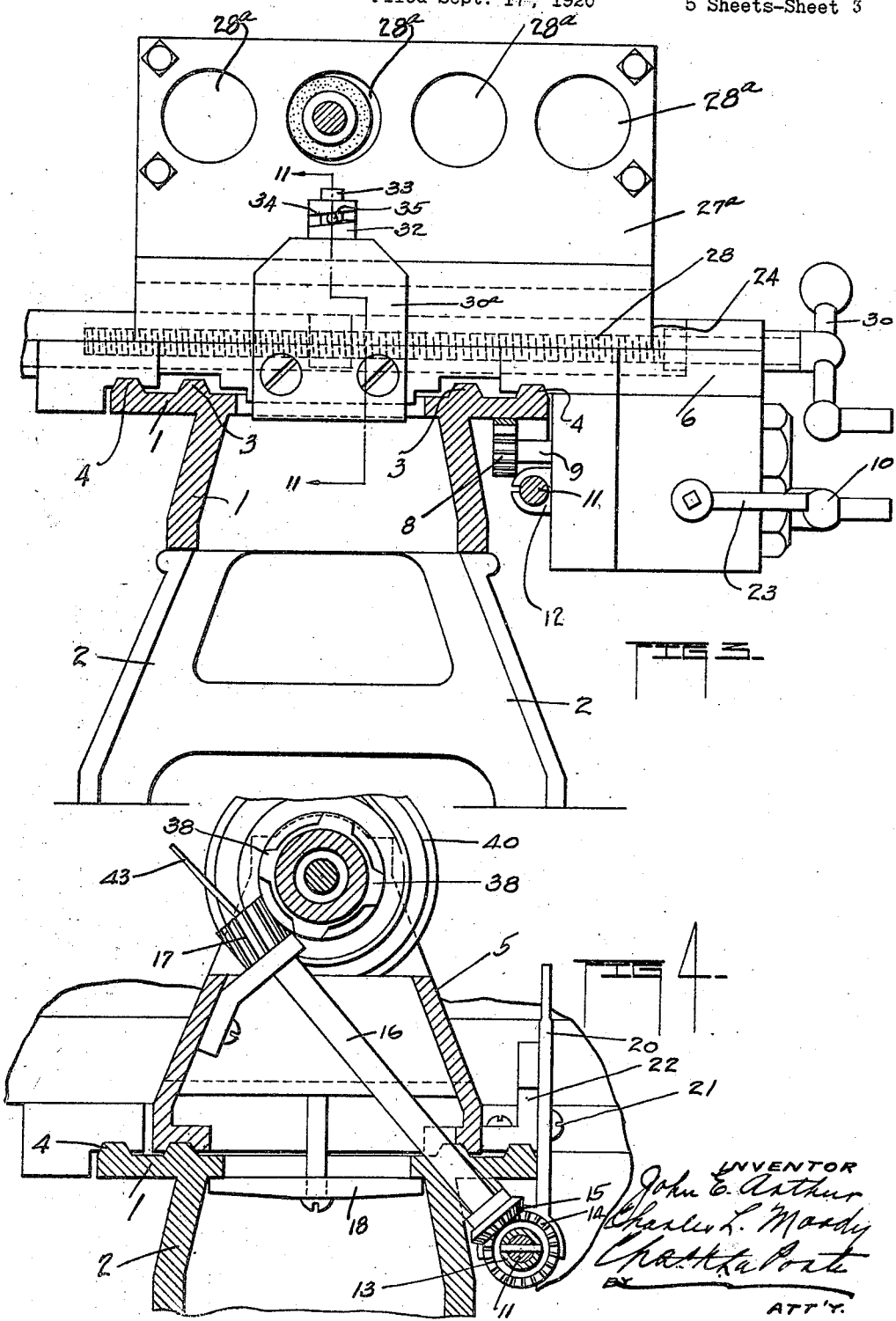

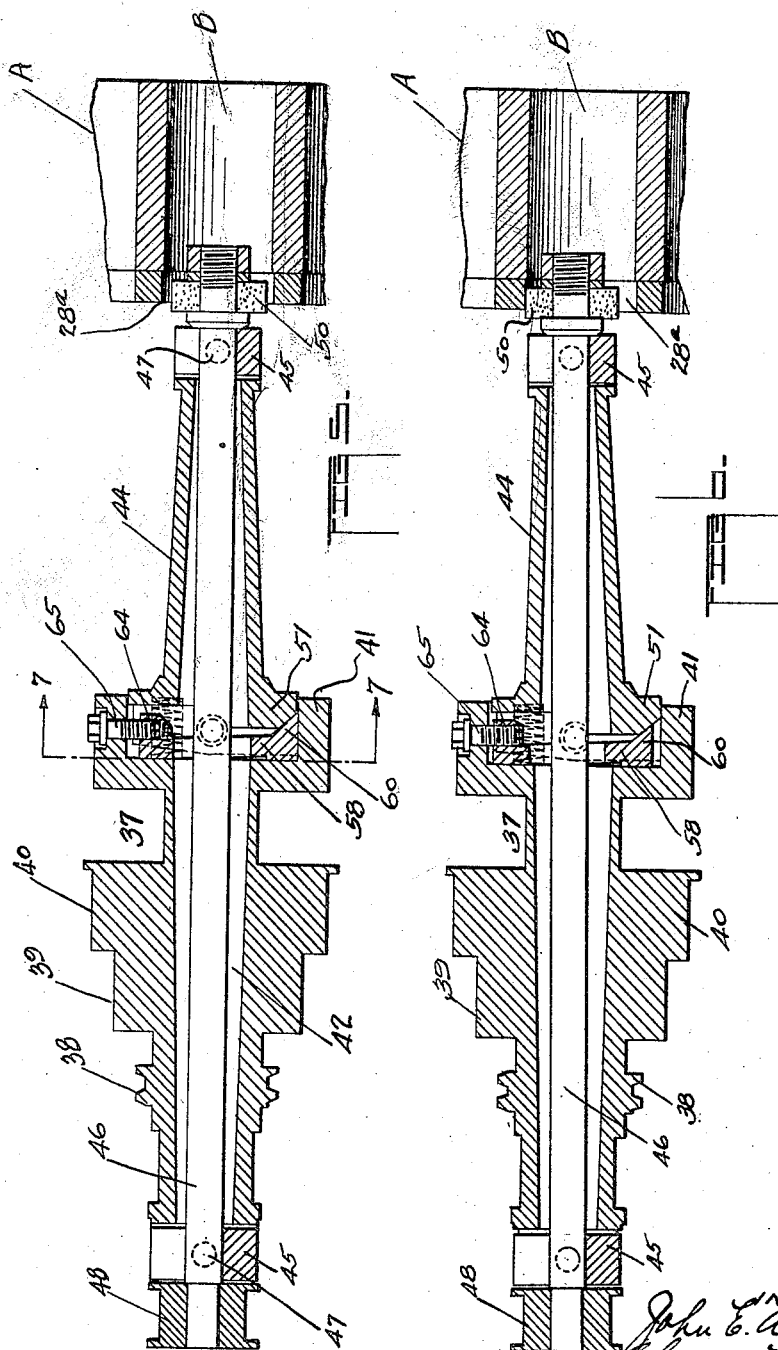

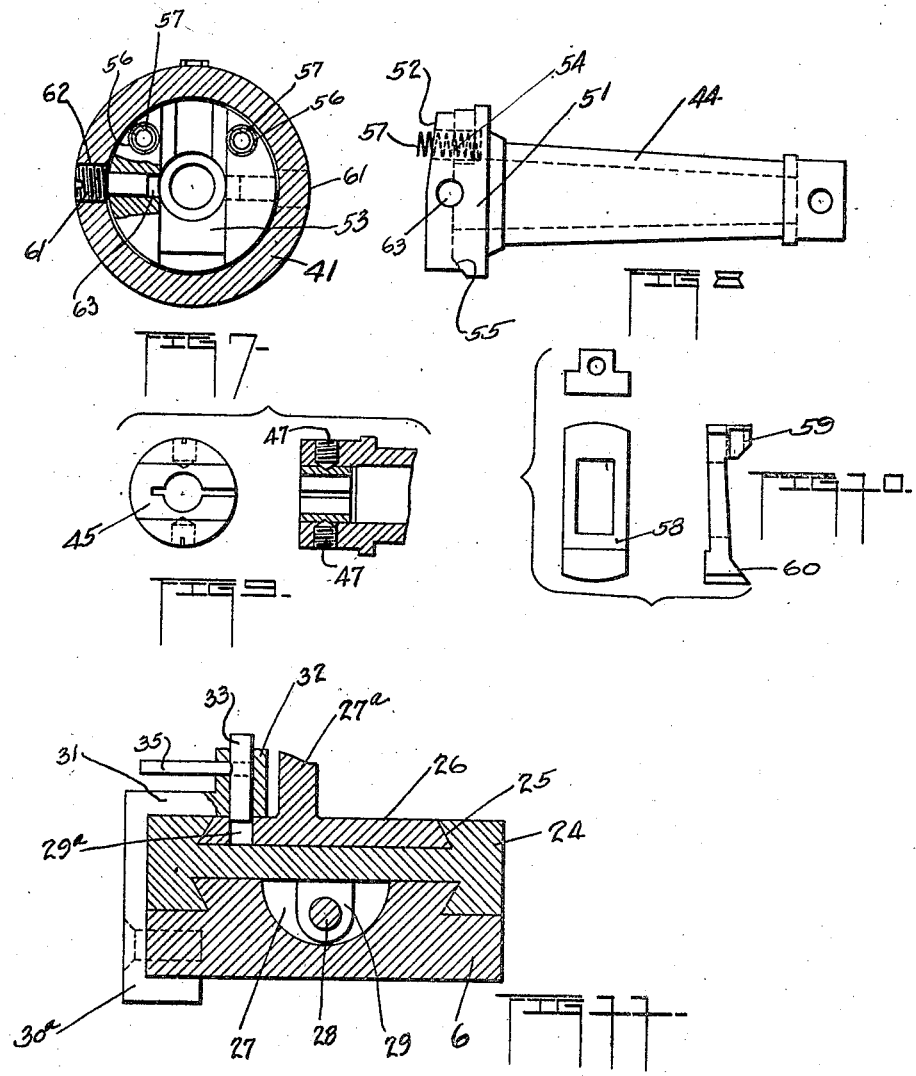

1,482,879

UNITED STATES PATENT OFFICE.

JOHN E. ARTHUR AND CHARLES L. MOODY, OF LANE, ILLINOIS.

BORING MACHINE.

Application filed September 17, 1920. Serial No. 410,867.

*To all whom it may concern:*

Be it known that we, JOHN E. ARTHUR and CHARLES L. MOODY, citizens of the United States, residents of Lane, in the county of De Witt and State of Illinois, have invented new and useful Improvements in Boring Machines, of which the following is a specification.

This invention has reference to boring machines, and while designed particularly for use as a machine for re-boring cylinders of automobiles, it will be found useful as a boring machine for other purposes.

One of the objects of the present invention is to provide for supporting the cylinder block on a gauge plate; such gauge plate being supported adjustably on the machine bed, whereby proper alinement of the cylinders may be made relatively to the boring or grinding tool.

A further object of the invention is to provide a hollow mandrel connected to a chuck in a manner such as will permit the mandrel to be adjusted so as to position its forward end (which carries the grinding tool), in position to grind the surfaces of the cylinders to conform to the openings in the gauge plate.

The invention has for a further object to provide the driving head including the chuck and associated pulleys and gearing with an elongated tapered tubular interior, and to connect in an adjustable manner with the chuck a hollow mandrel, the opening through which is tapered, and a shaft or spindle passing through the tapered opening in said head, and said hollow mandrel, and having connected thereto at its forward end a grinding wheel or tool. The purpose of such tapered openings and the means for adjusting the mandrel is to permit the alining of the grinding wheel or tool for action upon the cylinders.

The invention has for a still further object, to provide a grinding wheel or tool and means for operating the same, and a support for the cylinder block; said support being adjustable to aline the cylinders relative to the normal axis of the grinding wheel or tool, and to provide for moving the grinding wheel or tool sidewise or laterally to operate upon the walls of the cylinders.

That the invention may be more fully understood, reference is had to the accompanying drawings forming a part of this description and illustrating a preferred embodiment of the invention, in which:

Fig. 1 shows a side elevation of a boring machine, embodying our invention;

Figure 2 is a plan view of Fig. 1, part being broken away;

Figure 3 is a vertical sectional view as the same would appear if taken on the line 3—3 Figure 1;

Figure 4 is a vertical sectional view, parts broken away, as the same would appear if taken on the line 4—4, Figure 1;

Figure 5 is a longitudinal sectional view through the hollow driving head and hollow mandrel, the spindle and grinding wheel or tool in a position just prior to being set for grinding;

Figure 6 is a view similar to Figure 5, except that the mandrel has been adjusted so as to position the grinding wheel or tool in the gauge plate, which is the gauge to determine the size the cylinder is to be re-bored;

Figure 7 is a detail cross-section, as the same would appear on the line 7—7 Figure 5, looking in the direction of the arrow but omitting the sliding wedge;

Figure 8 is a side elevation of the hollow mandrel;

Figure 9 shows an end view and sectional view of the bearings for the grinding shaft, used at the rear end of the driving head and forward end of the hollow mandrel;

Figure 10 shows different elevations of the wedge used in the chuck for adjusting the hollow mandrel, and Figure 11 is a detail in section of parts, as the same would appear if taken on the line 11—11 Figure 3.

Like characters of reference denote corresponding parts throughout the Figures.

The machine includes the bed 1 supported on the legs 2, at each end, and said bed is provided with the two pairs of longitudinally arranged rails 3,3 and 4,4. The rails 3,3 support the head-stock 5, see Figure 4, machined to fit said rails, and on the rails 4,4 is slidably carried the main transverse table 6, machined to fit said rails, see Fig. 3. Carried by the head-stock are the power parts of the machine, together with the operating means for moving the main table 6, and on the table 6 is supported the cylinder block to be re-bored, or other parts to be operated upon.

The bed, along one side, is provided with the depending longitudinally arranged rack bar 7, and meshing with said rack bar, is a gear wheel 8, see Figure 3, on a shaft 9 journaled in the main table 6 and by suitable gearing, not shown, geared to the crank 10, which may be manipulated for moving the table 6 longitudinally of the bed, as is well understood in machines of this character. Also extending longitudinally of the bed preferably on the same side thereof as is carried the rack bar 7, is a threaded shaft 11. This shaft is journaled in suitable bearings at the opposite ends of the bed and is engaged by a nut 12 carried by the main table 6, as best seen in Figure 3. Slidably keyed to the threaded shaft 11, is a sleeve 13 provided at each end with the facing corresponding bevel gears 14, which may be alternately moved into and out of mesh with the bevel gear wheel 15 on the lower end of the inclined driving shaft 16, which at its upper end, carries a spiral gear 17, driven in a manner to be further explained. The shaft 16 is journaled in suitable bearings on the bed and in the head-stock 5, as best seen in Figure 4. It is understood that the head-stock has a permanent fixed position on the bed of the machine and may be clamped in said position by the clamp 18, see Figure 4, in a manner well known in machines of this character.

One end of the sleeve 13 is provided with the annular groove 19, in which operates the bifurcated end of a lever 20, fulcrumed at 21 to a bracket 22 secured to the side of the head-stock, as shown.

The manipulation of the lever 20 in opposite directions, will, as will be understood, move the sleeve 13 to move either of the bevel gears 14 into meshing contact with the bevel gear 15 and transmit motion to the threaded shaft 11, which, engaged by the nut 12, will move the main table 6 toward or from the frame or head-stock 5, as may be desired. The nut 12 is of the split type, see Figure 3, usually used in machines of this character, and controlled through the crank 23 for causing the nut 12 to grip the threaded shaft 11 when it is desired to move the main table 6 by power, and when the nut is released said table by means shown and described, may be moved manually on the bed.

As stated, the main table 6, while it moves longitudinally of the bed 1, extends transversely thereof to support the parts to be operated upon by the boring means. Having a slidable connection with the table 6, is a table 24. This table is moved with the table 6 longitudinally of the bed and has a slidable relation with said table 6 so as to be moved transversely of the bed 1 of the machine. As shown in Figure 11, the table 24 has a suitable dovetail connection with the table 6 and the table 24 is mortised as at 25 to receive the supporting plate 26 which has a dovetail connection therewith. The table 6 is dished out as at 27, which extends transversely of the bed of the machine so as to receive the threaded bar 28 engaged by a nut 29 on the table 24. On the outer end of the threaded rod 28 is carried a hand crank 30, which when manipulated, will move the table 24 and the supporting plate 26 transversely of the bed, as will be understood.

The supporting plate 26 has the upstanding plate portion 27$^a$ which serves as a gauge plate, having the plurality of horizontally aligned and spaced openings 28$^a$, see Figure 3. The bed of the supporting plate 26, in front of the upstanding plate portion 27$^a$, is provided with the plurality of spaced, preferably vertically disposed openings 29$^a$, see Figures 2 and 11. Each one of these openings is in alignment with the axis of an opening 28$^a$ in the gauge plate 27$^a$, and adapted to enter the said openings 29$^a$ when the table 24 and the supporting plate 26 have been moved to adjusted position cross-wise of the bed of the machine, is the means for locking said gauge plate in operative position. Connected with the main table 6 axially of the bed of the machine and of the head-stock, is a bracket 30$^a$, and said bracket has a portion 31 which overlies the table 24, and the supporting plate 26, and which is provided with an upstanding tubular bearing 32, in which is carried a short stem or rod 33 adapted to enter either one of the openings 29 in the supporting plate 26, and the tubular bearing 32 is preferably formed with the semi-spherical cam shaped slot 34, in which is operatively carried a stem 35, see Figure 1, which is connected with the stem or rod 33. The stem or rod 35 provides a hand-hold for the operator, who, when he oscillates the same in the cam slot, will raise or lower the stem or rod 33 in the tubular bearing 32, to lift the said stem or rod 33 out of or insert the same into one of the openings 29$^a$ in the supporting plate 26 to lock the same in position, it being understood, that when the table 24 with the supporting plate 26 is moved transversely of the bed, it is for the purpose of aligning either one of the openings 28$^a$ in the gauge plate 27$^a$ in line with the grinding part of the machine, and when so aligned, the stem or rod 35 is manipulated so as to cause the stem or rod 33 to enter an opening 29$^a$ in the supporting plate 26, to lock the gauge plate in position for the action of the boring means.

It is to be understood that the main table 6 may extend upon opposite sides of the bed of the machine as far as is desirable, and likewise the table 24 may be of a suitable length to support the desired size of gauge plate or supporting plate, and in the present instance, the table 24 and supporting plate 26 are shown of a length to support a cylinder block of a four cylinder engine, and while we have elected to show the table 24 and the supporting plate 26 of a length to receive a four-cylinder block, it will be understood that the said table and supporting plate may be either shorter or longer, as may be desired, so as to support cylinder blocks with less number of cylinders or more than that shown.

The drawings show a cylinder block designated A, having the four cylinders B, bolted to the upstanding gauge plate 27ª of the supporting plate by means of the bolts C, the said cylinders being in axial alignment with the four openings 28ª in the gauge plate, and in Figures 5 and 6, which illustrates the use of the machine, the openings 28ª of the gauge plate are shown to be slightly larger in diameter than the cylinders 13 of the cylinder block A.

It will therefore be understood, that the supporting plate 26, which may be of suitable length, is removable from the table 24 for the purpose of having attached thereto, a cylinder block, and that said supporting plate with the cylinder block attached, may be then connected to the table 24, and the latter adjusted to positions which will permit the operating means to rebore the cylinders to conform to the openings 28 in the gauge plate, as should be fully understood, and as will be further explained.

The head-stock 5 is provided with the upstanding spaced bearings 36, 36, in which is journaled the elongated driving head 37. This head is formed or provided with the spiral gear wheel 38 meshing with and driving the spiral gear wheel 17 on the driving shaft 16; also the pulleys 39 and 40 and a clutch 41. The bore 42 of the head 37 is preferably tapered, as best seen in Figures 5 and 6, being smaller at its outer end than at its inner end. The driving head may be driven from any suitable source of power through a belt 43 connected wih either of the pulley wheels 39 or 40. There is detachably, as well as adjustably connected with the chuck 41, a hollow mandrel 44, which is preferably tapered or cone shape, the bore of which corresponds to the bore of the driving head, the smaller diameter thereof being the outer end. The outer end of the head 37 and the outer end of the mandrel 44 are each provided with a preferably split bushing 45, see Figure 9, through which is carried and in which is journaled the opposite ends of a boring or grinding shaft 46, which passes through the driving head 37 and the mandrel 44, see Figures 5 and 6. These bushings are preferably held by the pointed set screws 47 to permit of slight oscillatory movement of the bushings when the grinding or boring shaft, together with the mandrel 44 are adjusted to rebore the cylinders. The said shaft at its driven end is provided with a pulley 48 to be engaged by a belt 49, or similar means, for operating the same, and at its grinding or boring end the shaft 46 carries a grinding wheel 50 or similar boring means.

The inner end of the mandrel 44 is formed or provided with an annular head 51, see Figs. 5, 7 and 8, the face of which is beveled, as at 52, and such face recessed as at 53 to provide the offset shoulder 54 and the beveled wall 55. Upon opposite sides of the recess 53 the face of the head is provided with sockets 56 in which are housed coil springs 57, normally protruding beyond the face of the head. Adapted to fit in the recess 53 of the head is a wedge member 58 having a projecting lug or boss 59 to overlie the offset shoulder 54, and also a beveled or tapered projection 60 to ride against the beveled wall 55, see Figures 5 and 6. The wedge member 58 is inserted into the recess 53 in the head of the mandrel, and when the head of the mandrel is inserted into the chuck 41, the springs 57 are compressed by engagement with the rear wall of the chuck. Pivot pins 61 are then screwed into openings 62 arranged diametrically opposite each other in the wall of the chuck, and inserted into openings 63 also arranged diametrically opposite each other in the head of the mandrel, see Figure 7. The mandrel is by this means coupled to the chuck, and in such a manner that the mandrel at its operating end may be moved sidewise, only in one plane, whereby the grinding wheel 50 may be adjusted relatively to an opening 28 in the gauge plate. Inserted through the wall of the chuck and having a threaded engagement with a threaded opening 64 in the lug or boss 59 on the wedge member 58 is a screw 65, which, when turned in one direction, will raise the wedge member, causing its beveled face 60 to ride against the beveled face 55 on the mandrel head and cause the latter to oscillate or swing on the pivot pins 61. Such oscillation further compresses the springs 57, and when the screw 65 is turned in the opposite direction, the springs will act to return the mandrel head, and the bevel faces 55 and 60 of the mandrel head and wedge member respectively, riding against each other, will assist in the wedge member returning to its normal position. The beveled or tapered face 52 of the mandrel head allows free play for the head in the chuck, see Figures 5 and 6, as will be understood. From the foregoing, the function of the tapered bores of the driving head and mandrel will be understood, i. e., to allow for the movement of the grinding shaft 46 when the mandrel 44 is adjusted to position the grinding wheel 50.

While the supporting plate 26 has a comparatively tight fit in the table 24, we prefer to employ means to secure the same in place, and therefore use the screw 66, see Figure 1, which may be used to clamp the plate 26 in place.

What we claim is:

1. In a boring machine, in combination, a bed, a driving head thereon, a grinding member connected axially with said head, a table movable longitudinally of the bed, a second table movable on said first table and transversely of the bed, a cylinder block support having a detachable connection with said second table and provided with horizontally disposed openings spaced equal to the openings in the cylinder block, and also provided with vertically disposed openings spaced equal to said horizontal openings, and means to enter said vertical openings to lock the second table and cylinder block support in adjusted positions relative to said grinding member.

2. In a boring machine, in combination, a table, power means for moving said table, means for manually adjusting said table, a second table, means for moving said second table on the first table, a gauge plate having a detachable connection with said second table and provided to support a cylinder block, means to secure the said gauge plate on said second table, means to lock the gauge plate and second table in adjusted positions on said first table, said locking means comprising complementary, locking parts arranged to lock the gauge plate in adjusted positions equal to the spacing of the cylinders in the block, grinding means, and means for operating said grinding means.

In witness whereof, we have hereunto affixed our hands this 31st day of August, 1920.

JOHN E. ARTHUR.
CHARLES L. MOODY.